United States Patent [19]
Taylor

[11] 4,351,194
[45] Sep. 28, 1982

[54] GYRO AUTOPHASE SYSTEM

[75] Inventor: Allen R. Taylor, Nutley, N.J.

[73] Assignee: The Singer Company, Little Falls, N.J.

[21] Appl. No.: 145,517

[22] Filed: May 1, 1980

[51] Int. Cl.³ .............................................. G01C 19/10
[52] U.S. Cl. ........................................ 74/5.37; 74/5.7
[58] Field of Search ............... 74/5.7, 5.37, 5.6 R; 318/701, 703, 314, 318

[56] References Cited

U.S. PATENT DOCUMENTS

| | | | |
|---|---|---|---|
| 3,694,716 | 9/1972 | Eland | 318/318 X |
| 3,702,569 | 11/1972 | Quinn et al. | 74/5.7 X |
| 3,896,358 | 7/1975 | Tanikoshi | 318/318 X |
| 4,085,355 | 4/1978 | Fradella | 318/703 |
| 4,257,280 | 3/1981 | Coles et al. | 74/5.7 X |
| 4,266,432 | 5/1981 | Schroeder et al. | 74/5.7 |

*Primary Examiner*—Rodney H. Bonck
*Attorney, Agent, or Firm*—Morris Liss; Thomas W. Kennedy

[57] ABSTRACT

Gyro drift is reduced by measuring the positional relation between the rotating field of a driving synchronous gyro motor and a reference point on the gyro rotor at start-up. After the measurement is made, it is adjusted to a pre-established fixed value. Adjustments to the pre-established value occur each time the gyro is started.

2 Claims, 1 Drawing Figure

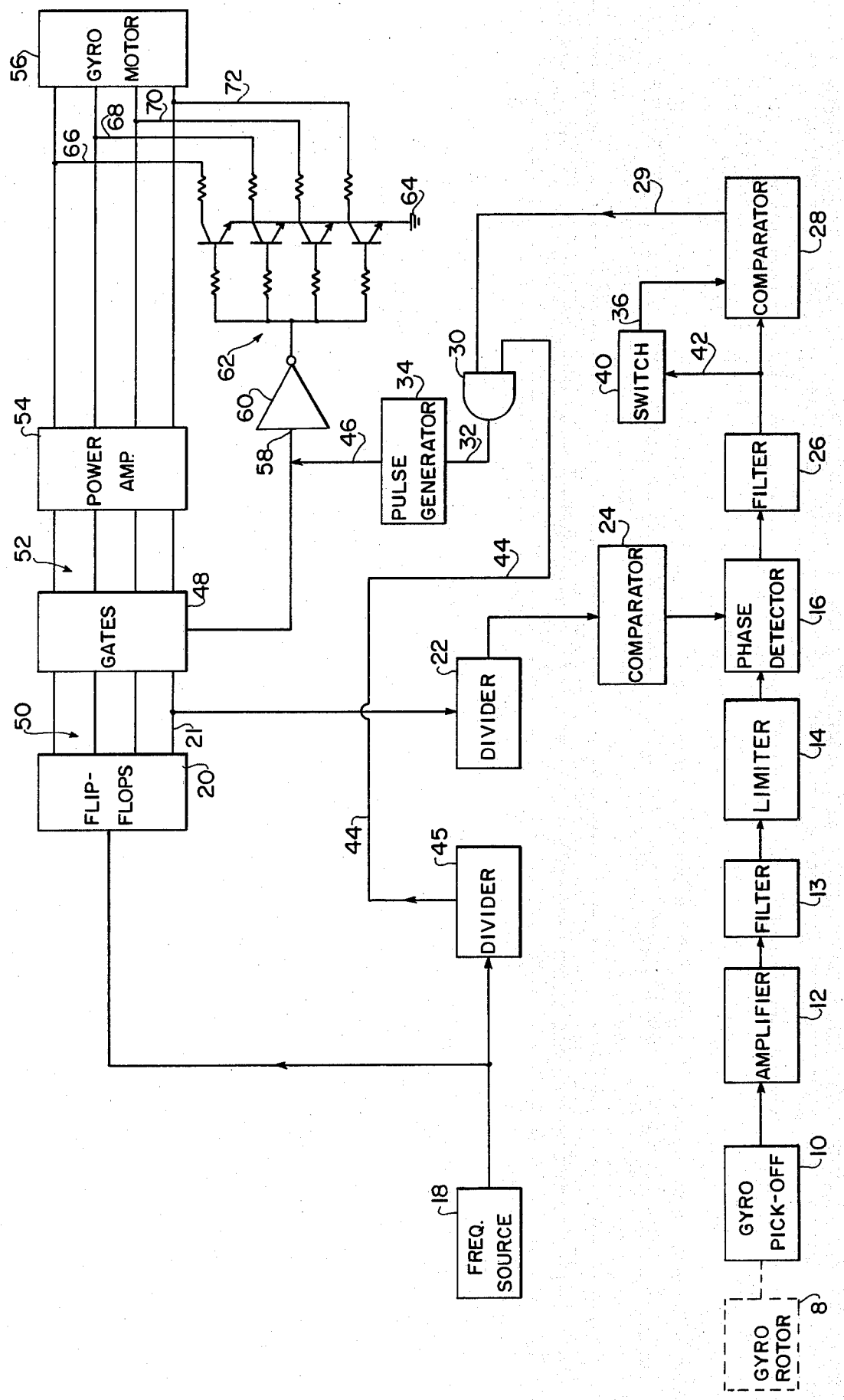

GYRO AUTOPHASE SYSTEM

FIELD OF THE INVENTION

The present invention relates to gyroscope (gyro) control systems and more particularly to such a system for reducing gyro drift.

SUMMARY OF THE INVENTION

It has been determined that day-to-day drift of conventional gyros arises in part from two separate drift-inducing sources:
1. a phase-related magnetic force that exists between a gyro stable element (rotor) and a rotating excitation field of a driving gyro motor;
2. vibration communication between two adjacently situated gyros.

Gyro drift changes, due to these sources, each time a gyro is started. The reason the drift changes is due to the fact that at the moment a driving gyro motor is synchronized with the rotating field of the driving motor excitation voltage, magnetic poles are set in the motor hysteresis ring of the driven gyro. The angular position that these poles are set in the motor rotor is entirely random, thereby establishing a rotational position between the synchronous rotating gyro wheel (stable element) and the rotating motor excitation field that changes each time the gyro is started. In the past, elaborate gyro control systems have been devised to measure day-to-day drift. However, the present invention recognizes that if certain phase relationships can be established between the driving motor and the gyro rotor at start-up, the day-to-day gyro drift due to the aforementioned sources can be reduced more simply and inexpensively.

BRIEF DESCRIPTION OF THE PRESENT INVENTION

The present invention is directed to a gyro autophase system which accomplishes the detection of the phase relation between a gyro output signal (which provides an indication of gyro rotor position) and the gyro motor excitation. After detection of this phase relation, the system provides a means for removing magnetic poles established by the motor rotor and changing the positions of the poles to establish a fixed phase relation between the rotating field of the motor and the gyro rotor. The system re-establishes this relation each time the gyro is started. When this is accomplished during each start-up, the rotational relation between the rotating gyro rotor and the rotating excitation field of the driving motor will always be the same and drift due to the small force between the rotating field and rotor torquer magnets, normally found in the gyro rotor, will be the same. In addition, when each rotor of two adjacently situated gyros establishes a fixed relation between the applied excitation of a respective driving motor and the corresponding gyro rotor, and the two gyros are excited from the same frequency source, the vibration induced drift will always be the same and will not vary from day to day.

The above-mentioned objects and advantages of the present invention will be more clearly understood when considered in conjunction with the accompanying drawing, in which:

BRIEF DESCRIPTION OF THE FIGURE

The FIGURE is a block diagram of one implementation of the gyro autophase system.

DETAILED DESCRIPTION OF THE INVENTION

Referring to the FIGURE, a number of components are represented in block form. Each of the blocks illustrated constitutes known conventional circuits. However, it is the combination of these components in a unique configuration and operation which constitutes the invention. A conventional gyro pick-off 10 generates a signal in the customary manner. The conventional gyros to be used with the present system are adjusted to produce a gyro rotor amplitude modulation that is sufficient to permit the separation of the rotor frequency from other frequency components present in the signal from the gyro pick-off 10. Examples of available pick-ups which will be appropriate for the present invention include a magnetic pick-up which detects when a certain reference point on a gyro rotor passes a reference point on the housing of the gyro. Alternately, an optical pick-up used to sense gyro rotor rotation may be employed. The signal from the pick-off 10 is fed to an amplifier 12, the output of which is conditioned by filter 13. The output from filter 13 is a sine wave signal having a frequency equal to the rotation frequency of the gyro rotor 8. The filtered signal is connected to the input of a limiter 14, which clips the sine wave to generate a corresponding square wave signal of constant amplitude thus providing a first input to the phase detector 16. The phase detector 16 determines the phase difference between the signal from the gyro pick-off 10 and a derivative of the excitation signal for a gyro motor as will now be described.

Frequency source 18 provides a sine wave signal, typically in the 1.6 kHz. range, which undergoes conversion to a four-wire, two-phase signal by utilizing flip-flops 20.

One of the leads (21) from the four-wire output of flip-flops 20 provides an input to a divider circuit 22. A signal of reference phase is thus obtained by dividing down the gyro excitation frequency, on lead 21, by a factor, typically 2, and a comparator 24 ensures a constant amplitude for the divided-down signal and provides the reference input (second input) to phase detector 16. The output of the phase detector 16 undergoes conditioning by filter 26 so that a DC signal is recovered representing the phase difference between the counted-down excitation frequency and the gyro rotor frequency modulation signal. It is this DC signal at the output of the filter 26 which represents a rotational position difference between the gyro motor excitation rotating field and some fixed point on the gyro motor.

A first input of comparator 28 is connected to the output of filter 26. The comparator itself is a conventional level detection circuit also known as a window comparator which determines whether the filtered output from phase detector 16 is within a particular phase range (window) corresponding to the desired rotational position difference between the gyro motor rotating excitation field and a fixed point on the gyro rotor. The comparator 28 has its output 29 connected to the first input of an AND gate 30, the output 32 of the gate being connected to a pulse generator 34 which controls energization of a driving gyro motor 56, as will be discussed in greater detail hereinafter. A second input 36, of the phase window comparator 28, is provided by the output of switch 40. The input 42 of the switch 40 is connected in parallel with the output of filter 26. The switch closes shortly after start-up, when the gyro rotor 8 assumes the preselected phase relationship with the gyro motor excitation. The switch 40 is comprised of an operational amplifier and functions as a conventional hysteresis circuit which is included to enable the comparator 28 whenever the output from phase detector 16 is negative. The comparator 28 is opened by the switch 40 when the output from phase detector 16 approaches the phase range (window) from a positive direction. The switch 40 is needed only when two gyros are located in interferring proximity with one another and it becomes necessary to remove the 180 degrees ambiguity that results from the fact that the motor excitation frequency is twice the motor rotation frequency.

A second input to AND gate 30 occurs along lead 44 which carries the output from a divider 45. The divider has its input connected to the power supply 18 and serves to establish a timing interval for pulse generator 34, via AND gate 30. Typically, the output from divider 45 is a one PPS signal. The output from AND gate 30 is a logic 1 when the filtered output from phase detector 16 is out of the preselected range (window) of the comparator 28. In a typical implementation of the invention, the window is set with the upper threshold at +5° and the lower threshold at −5°. As long as the phase of the rotor signal and the counted-down motor excitation give a phase detector output that is outside the ±5° limit, a trigger pulse will be applied to the pulse generator 34 at the approximate one PPS rate of the signal from divider 45. The pulse generator 34 then generates a controlled pulse width negative pulse, at its output 46, to a control input of four-gate configuration 48 which may be provided on conventional chips such as the standard 54LS00 chip. An output along leads 50 from the four-gate configuration removes the excitation to motor 56 for the period of the pulse from generator 34. The pulse width mentioned is chosen to allow the rotor of motor 56 to slip slightly behind the rotating motor excitation field before the excitation is re-applied. This application of excitation establishes new magnetic poles in the motor rotor. Typically, the amount of motor rotor slip for each pulse is eight degrees.

A signal inverter 60 is connected at its input 58 to the output 46 of the generator 34 and the inverter applies a positive pulse at its output to the base of four ganged NPN transistors 62 that place a four-wire, two-phase electrical load, via transistor collectors 66, 68, 70 and 72, on the gyro motor 56 which acts as an electrical generator during the time that the excitation is removed. The transistors have their emitters commonly grounded at 64. Otherwise stated, dynamic braking of the gyro motor 56 is achieved during this time which assists the bearing friction of the gyro motor 56 in developing motor slip during the time the excitation is removed.

In operation of the invention, the gyro motor 56 is started and synchronizes at some arbitrary phase and is then caused to slip in small increments, such as the mentioned typical eight degrees increments, until the signal from phase detector 16 comes into the range of the window of comparator 28, from the positive direction. When the output level of the phase detector 16 is within the window, such as the mentioned ±5° window, the output from comparator 28 goes to a low logic level and the pulse generator 34 stops outputting pulses. The four-gate configuration 48 that passes the two-phase, four-wire signals from leads 50 to leads 52 remain "on" and the power amplifier 54 boosts the current from the gate configuration 48 to the gyro motor 56. The motor 56 is now locked with the phase relationship which has been established between the rotor 8 and the rotating excitation field in the motor 56.

It should be understood that the invention is not limited to the exact details of construction shown and described herein for obvious modifications will occur to persons skilled in the art.

I claim:

1. A system for reducing gyro phase ambiguity due to two proximately located gyros in interferring vibrational communication with one another by positioning a reference point on the rotor of a gyro in a preselected fixed phase relation with the excitatio field of a gyro driving motor, the system comprising:

a gyro rotor;

pick-off means associated with the rotor for determining the phase of a reference point on the rotor;

means for generating an excitation field for the motor;

detecting means connected in circuit, at its inputs, to the pick-off means and the generating means, for detecting the phase difference between the rotor reference point and the excitation field;

a window comparator connected at a first input thereof to the output of the detecting means;

switching means having an input thereof connected to the output of the detecting means;

a second input of the comparator connected to an output of the switching means for enabling the comparator when the output of the detecting means assumes a first polarity, the comparator being disabled by the switching means when the output from the detecting means approaches a preselected phase range from an opposite polarity, thereby avoiding phase ambiguity between two proximately located gyros in interferring vibrational communication with one another; and inhibit means connected between the output of the generating means and the gyro motor, the inhibit means having an input connected to the output of the comparator means for inhibiting power delivery from the excitation field generating means to the motor when the detected phase difference falls outside the preselected range, thereby causing the motor to slip until the detected phase difference falls within the preselected range.

2. A method for reducing gyro phase ambiguity due to two proximately located gyros in interferring vibrational communication with one another, the method comprising the steps:

determining the phase of a reference point on the rotor of the gyro;

generating an excitation field for a gyro driving motor;

detecting the phase between the reference point on the rotor and the excitation field;

comparing the phase with a preselected phase range and enabling the phase comparing only when the phase range is approached from a preselected polarity; and inhibiting power delivery from the excitation field to the motor when the detected phase falls outside the range, thereby causing the motor to slip until the detected phase falls within the range.

* * * * *